March 11, 1941.    E. P. FRANKE    2,234,338
ARTICLE AND PROCESS OF MAKING THE SAME
Filed April 10, 1939
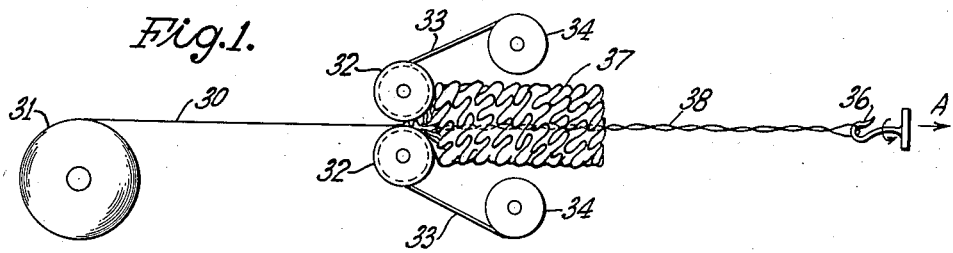
*Fig. 1.*
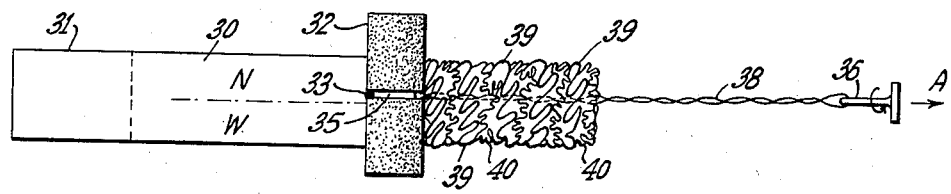
*Fig. 2.*
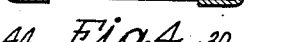
*Fig. 3.*
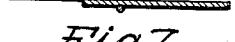
*Fig. 6.*
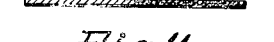
*Fig. 10.*
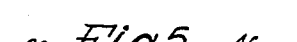
*Fig. 4.*
*Fig. 7.*
*Fig. 11.*
*Fig. 5.*
*Fig. 8.*
*Fig. 12.*
*Fig. 13.*
*Fig. 9.*
*Fig. 15.*
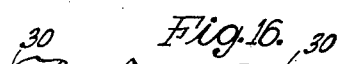
*Fig. 16.*
*Fig. 14.*
*Fig. 17.*
*Fig. 18.*
*Fig. 19.*  *Fig. 20.*
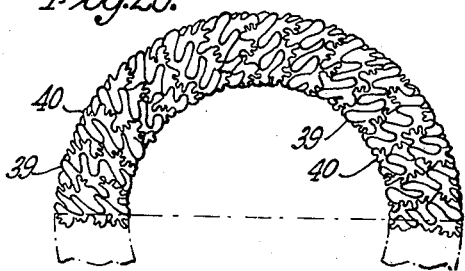
INVENTOR
EDWARD P. FRANKE
BY
*Worth Wade*
ATTORNEY Patented Mar. 11, 1941

2,234,338

UNITED STATES PATENT OFFICE 2,234,338

ARTICLE AND PROCESS OF MAKING THE SAME

Edward P. Franke, Baltimore, Md., assignor to Sylvania Industrial Corporation, Fredericksburg, Va., a corporation of Virginia Application April 10, 1939, Serial No. 267,006

8 Claims. (Cl. 41—10)

The present invention relates in general to decorative materials, and in particular to decorative articles, such as garlands, festoons, wreaths, ornaments and the like and a process for making the same, and includes correlated improvements designed to enhance the appearance, structure and utility of such articles.

Heretofore garlands have been made by pleating a strip of material, passing a single wire through holes formed in the pleats, and twisting the strip of material about the wire. The twisted structure is not stable and tends to untwist because the wire core does not hold the strip in the twisted condition. This ornament is difficult to manufacture, because of the numerous operations required. Alternatively, a decorative material has been made heretofore by cutting transversely the longitudinal edges of a strip of paper to form a multiplicity of narrow strips extending from the center and twisting the same about a central axis. This produces an article which is very fragile and is subject to tearing and, when crushed, such an article is permanently flattened because the structure has little rigidity or resilience. Moreover, the paper strips are torn and separated by the slightest misuse and rough handling. Furthermore, garlands have been manufactured by uniting by adhesive two strips of paper having a wire centrally disposed longitudinally between them and then twisting the paper strips about the wire. This method is undesirable since it requires the use of adhesives which are expensive, difficult to apply and which discolor the product. The use of such adhesives not only complicates the manufacture of the garland, but increases the cost of production. Through drying and chemical reaction, the adhesive commonly employed eventually embrittles the article and causes it to become fragile and easily damaged in use.

Therefore, it is a general object of the present invention to provide a decorative material formed of a convoluted strip material, which article will have a substantial rigidity and resiliency whereby it will be resistant to damage in shipping, handling and use.

Another object of the invention is to provide a garland of convoluted flexible strip material which is characterized by novel decorative effects.

A still further object of the invention is to provide an ornament formed of light-reflecting material, the material capable of being multi-colored to produce unusual and brilliant effects.

Another object of the invention is to provide an ornamental convoluted strip material adapted to form a wide variety of decorative articles which retain their shape and structure during shipping, handling and use.

A still further object of the invention is to provide a garland which can be manufactured in a simple and economical manner.

Other objects of the invention will in part be obvious and will in part appear hereinafter.

According to the present invention, there is provided a decorative material comprising a cable formed of a plurality of flexible deformable strands twisted together and a web of flexible sheet material disposed longitudinally between the strands of the cable, the edges of the web forming a convoluted spiral comprising a multiplicity of overlapping folds, the web having a greater length than the strands. The discovery has been made that novel and useful decorative articles can be made by feeding a web of sheet material between strands such as wires, while at the same time drawing and twisting the wires together.

The invention accordingly comprises the several steps and relation of one or more of such steps with respect to each of the others, and the article possessing the features, properties, and the relation of elements, which are exemplified in the following detailed disclosure, and the scope of the invention will be indicated in the claims.

In the drawing which accompanies the specification and forms a part thereof and in which like characteristics refer to like parts throughout the several figures:

Fig. 1 is a view in elevation of one embodiment of means for producing the article of the invention;

Fig. 2 is a top view of a part of the apparatus shown in Fig. 1;

Figs. 3 to 5 inclusive represent cross-sectional views of as many embodiments of the web used in the article wherein the edge of the web has been modified;

Figs. 6 to 9 inclusive represent cross-sectional views of as many embodiments of a web of the invention comprising a plurality of superimposed strips of material;

Figs. 10 to 12 inclusive represent cross-sections of as many embodiments of a web of the invention where part of the strip of material is modified by impregnation;

Figs. 13 to 16 inclusive substantially represent perspective views wherein the web of the invention is modified by printing;

Figs. 17 and 18 represent two embodiments of the web of the invention whereby the shape of the strip material has been modified;

Fig. 19 represents a full view of one embodiment of the article of the invention; and Fig. 20 is a fragmentary view in elevation showing the article of the invention formed into a wreath.

In the specification and appended claims, the expression "decorative articles" is intended to include all classes of garlands, as well as wreaths, ruchings, leis, stars, crosses, hearts, ornaments, streamers and other articles of allied shapes and structures which can be formed by this invention. The present invention has particular application to the formation of wreaths of the type employed for Christmas decorations.

The cable used in the article of the invention may comprise any suitable flexible strands of plastic material which are capable of being permanently deformed as by twisting such, for example, as wires, tapes, bands and the like of iron, copper, aluminum, lead and other metals and alloys thereof, and fibrous or non-fibrous plastic materials such as paper, cellulose hydrate, cellulose derivatives and resins which are capable of being twisted and then rendered rigid after twisting; that is, fixed while in the twisted configuration 51, as shown in Fig. 8. In a preferred embodiment, the cable comprises a heavy gauge wire twisted with a wire of lighter gauge. Such a cable produces a more pleasing result in the finished article by rendering the convolutions of the web more compact. The lighter gauge wire has a tendency to twist about the heavier wire as an axis, contrasted on the other hand to the tendency of wires of the same gauge to twist mutually together and not one about the other.

Fig. 9 discloses a modification wherein flat bands 50 are used in place of the round members 33 and 51 in the other modifications.

In another embodiment, the cable is formed from strands of paper, textile fibres, resins or cellulosic derivatives and the like which are preferably sized with a suitable material to render the cable rigid and fixed within a short time after the application. The sizing composition may include starches, viscose solutions and solutions of resins and cellulose derivatives, such as the ethers and esters of cellulose which are capable of being rendered relatively stiff by the application of heat or by treatment with suitable insolubilizing agents such as acids, salts, heat and other precipitants. For example, a cable constructed in whole or in part from resins and resinous materials may be "set" in any predetermined state, position or configuration and there rendered non-plastic and relatively rigid by the use of heat by which the resin passes from a soft state to a harder state.

The web used in the article of the invention may be formed from flexible sheet material which in turn may be formed in whole or in part of fibrous or non-fibrous material. The expression "web" includes foils, pellicles and sheets. Among the fibrous sheet materials that may be employed are paper of all kinds, leather, asbestos, textile fabrics and the like. Examples of non-fibrous cellulosic materials may include the following: regenerated cellulose and cellulose derivatives such as cellulose ethers and esters. The cellulose ethers may include the aryl and alkyl derivatives of cellulose such as methyl cellulose, ethyl cellulose, benzyl cellulose, etc. The cellulose esters may include cellulose nitrate, cellulose acetate, cellulose formate and other organic and/or inorganic cellulosic compounds and derivatives. Sheet materials and pellicles of non-fibrous organic plastic material may be used in whole or in part such, for example, as pellicles formed from gelatin, casein, synthetic resins, chlorinated rubber, rubber substitutes and the like. Any of the above-mentioned non-fibrous materials may be metallized by spraying the sheets or foils with metal particles or with a lacquer containing metal particles.

The web may be formed of flexible metallic material such as sheets, pellicles and foils formed from tin, copper, lead, aluminum and the like and their alloys. The article may be made from metal foils, or metallized paper or a combination of both or the like, all of which are light-reflecting and flexible.

It is to be understood that the pellicles, foils and sheets of the non-fibrous organic plastic materials of the invention may be rendered flexible by suitable plasticizing agents and plasticizers known to the art. The materials may be plasticized before, during and/or after forming them into the article.

The web may be treated further before, during and/or after forming it into the article with softening and/or swelling agents to facilitate the convoluting of the web. For one example, a web of "Cellophane" is exposed to a treatment by a swelling agent such as water vapor and the softened web formed into the article, after which the softening agent may be evaporated as by drying. The softening tends to decrease tearing of the web during formation.

The articles may be flameproofed or fireproofed before manufacture, or preferably after the manufacture, by use of suitable fireproofing agents. For fibrous and non-fibrous cellulosic material, suitable fireproofing agents include boric acid, ammonium sulphate, sodium stannate, phosphoric acid salts and alkyl esters of an acid of phosphorus and the like, all of which may be combined with the web or the articles by coating or impregnating.

In the now preferred embodiment of this invention, the article is formed of a strip of "Cellophane" twisted between a plurality of metal wires. Referring to Figs. 1 and 2 of the drawing, a continuous web of flexible material 30 from sheet material supply roll 31 is fed between coacting rollers 32. Wires 33 are fed from wire supply rolls 34 into circular grooves 35 provided in the rollers. The wires are drawn between the rollers and simultaneously twisted together by suitable means such as the hook 36 which may be drawn in the direction of the arrow A by means of a suitable travelling carriage as used on a conventional tensile machine. In operation, the web 30 is drafted between the wires 33 by the friction rollers 32 as the wires are twisted together to form the cable 38. The rollers 32 generally travel at a greater surface speed than the wires so that the wires actually slide in the grooves which serve chiefly to guide the wires into twisting position. As the web is fed between the wires, it is convoluted as shown at 37 in Fig. 1.

The rate of feed of the web to the rate of travel of the wires is regulated so that the edges of the web form a plurality of overlapping rippling folds which give the article high rigidity and resiliency. In the now preferred embodiment, the web is fed at a rate of from 10 to 13 times faster than the rate at which the wires 33 are drawn away from the rollers. It has been found that the speed ratios of web to wire may extend over a range of from 5:1 to that of 20:1 and preferably in a range of between 10:1 and 15:1. Expressed in another way, the preferred ratio of 13:1 means that for every inch of wire used, thirteen inches of web material is withdrawn from the supply roll 31.

Referring to the drawing, the article 37 thus produced is a decorative article comprising a web disposed between the plies of the cable 38, the edges of the web forming a spiral comprising overlapping folds. In that embodiment shown in Fig. 2, the web 30 is fed off-center or eccentric with respect to the wires 33. The resulting product is novel in structure, design and utility. When thus formed, the wider side W of the web forms a large spiral 39 of relatively few folds, while the narrow side N forms a smaller spiral 40 comprising a multiplicity of small folds, those folds lapping back upon themselves to form even larger folds. The finished article made in this way has an over all diameter which is much greater than the width of the strip from which it was formed because the wider side determines the final diameter. Thus a distinctive structure and novel decorative effect are attained.

In another embodiment of the invention, the edges of the sheet material may be modified and/or varied as shown in Figs. 3, 4 and 5. For example, in Fig. 3, a web 30 was modified by applying to one or both edges narrow folded strips 41 and 42 which are preferably united to the web by adhesive. The strips 41 and 42 may be of like or contrasting colors with respect to each other and with the web. In Fig. 4, the sheet material may be modified in another way by folding the marginal edges 43 and 44 of a web 30 upon themselves. Fig. 5 shows an example whereby the web 30 is folded at one edge only, that is, edge 46. If the web of Fig. 5 is of unlike appearance on the two surfaces, it gives a product in which alternate spirals are of different appearance.

Other decorative effects can be produced by the utilization of a plurality of sheet materials laminated and/or fed to the wires in spaced relation with respect to the cable or in different sizes and colors, as shown in Figs. 6 to 9 inclusive producing unusual effects in structure, design and color in the finished article.

Other variations in design and color may be produced by the use of a foil impregnated in predetermined areas with coloring or opaquing substances such as dyes and pigments, so that different areas of the web contrast in color and/or opacity. This sheet material may be formed by impregnating substantially one-half of the sheet 47 in longitudinal areas as shown in Fig. 10, or in a central area 49 as shown in Fig. 11, or marginal areas 53 as shown in Fig. 12, the untreated areas 48 remaining uncolored and/or transparent.

Further, novel variations in design or color may be obtained by printing the sheet material as is shown in Figs. 13 to 16 inclusive. The printing may be accomplished by any suitable means and the printed areas may be on one or both sides and with transparent or opaque inks. The printed areas 55 may extend across the width of the web 30 at spaced intervals as shown in Fig. 13 or along marginal areas 56 as shown in Fig. 14, or in a central area 59 as shown in Fig. 15, or on one side only as the area 60 illustrated in Fig. 16.

Thus it will be seen that many variations in the finished product may be produced by modifying, changing or adding to the initial sheet material in the process of formation. It is to be understood that all possible combinations may be made of these articles shown in Figs. 3 to 16 inclusive.

Other articles of novel structure, form and design may be produced by varying the width and shape of the web 30 as by die-cutting the sheet material before use or by cutting or trimming the decorative article after its formation. For example, a web of "Cellophane" may be cut serpentine fashion along its central axis and the two webs so formed used singly or superimposed to form a garland. A decorative object, similar in shape to a pine cone, Christmas tree, etc., may be produced by using sheet material as shown in Fig. 17, and formed into the shape shown in Fig. 19. This boat-shaped web shown in Fig. 17 is fed between the rollers 32 and twisted between the wires 33, to form a compact imitation of a pine cone 57, as shown in Fig. 19. A plurality of shaped articles may be made upon the same cable by using a shaped web such as that shown in Fig. 18 whereupon, after formation, the articles may be cut apart. The shaped web of Fig. 18 may be die-cut from a large roll of stock without loss, the narrow portion 61 becoming the wide portion 62 on the next adjacent sheet or strip therefrom. A multitude of other articles having ellipsoidal, round, spherical and other shapes and sizes can be readily formed in similar manners.

After formation, the article manufactured may be further decorated by spraying or sprinkling the edges thereof with an ink, a paint or a lacquer to produce the appearance of ice, snow, fire and other natural effects. The edges may even be treated with a tacky composition and particles of effect material such as bronze powder or confetti sprinkled about the article and caused to adhere thereto. Interesting effects can be produced by painting the edges and convolutions of the garland after its formation.

Advantages of this article lie primarily in the simplicity of its manufacture and in the unusual structure and function of the product. Since no punching or gluing is required and since the article can be turned out at a surprisingly fast rate of speed, the expense of production is materially less than that of prior articles of the same general class. When the article is pressed and the pressure released, it springs back to the original shape because of its natural resilience because it is formed of a continuous sheet or a plurality of sheets with convoluted edges. It is, therefore, not easily torn and is quite resistant to rough handling and abuse in shipping, handling and use.

Since certain changes in carrying out the above process, and certain modifications in the article which embody the invention may be made without departing from its scope, it is intended that all matter contained in the above description or shown in the accompanying drawing shall be interpreted as illustrative and not in a limiting sense.

The invention having been described, what is claimed is:

1. As an article of manufacture, a decorative material comprising a plurality of metallic wires twisted together, and a web of flexible material spiralled between the wires, and having a multiplicity of overlapping folds, said web having a length 5 to 20 times the length of the wires.

2. As an article of manufacture, a decorative material comprising a plurality of contiguous strands, and a web of material having continuous edges disposed in a spiral between and maintained in position solely by the strands, said web being formed of a plurality of sheets.

3. The process of making a decorative material comprising directing flexible strands into contact with the opposite faces of and eccentric to a web of flexible material, positively advancing the web substantially at the point of contact of the web and strands, twisting the strands and web together and positively advancing the strands and web during the twisting.

4. A decorative article comprising a plurality of twisted strands, a continuous web of material eccentrically disposed relative to said strands in a spiral between and maintained in position by the strands.

5. A decorative article comprising a plurality of twisted strands and a web of material disposed in a spiral between and maintained in position by the strands, said web being formed of a plurality of sheets at least one of which is eccentrically disposed relative to said strands.

6. The process of making a decorative material comprising directing flexible strands into contact with the opposite faces and eccentric to a web of flexible material, positively advancing the web substantially at the point of contact of the web and strands, twisting the strands and web together and positively advancing the strands and web during the twisting, the rate of advance of the web relative to the strands being such as to cause the web to be 5 to 20 times as long as the length of the strands.

7. The process of making a decorative material comprising directing flexible strands into contact with the opposite faces of a web of flexible material, positively advancing the web in advance of the point of twisting the web and strands at a greater rate than the strands, twisting the strands and web together and positively advancing the strands and web during twisting, the rate of advance of the web relative to the strands prior to the point of twisting being such as to cause the web to be from 5 to 20 times as long as the strands.

8. As an article of manufacture, a decorative material comprising a plurality of metallic wires, one of said wires being of lighter gauge than the other of said wires and being twisted about the said other wire as an axis, and a web of flexible material spiralled between the wires, and having a multiplicity of overlapping folds, said web having a length 5 to 20 times the length of the heavier gauge wire.

EDWARD P. FRANKE.